(12) United States Patent
Iwama

(10) Patent No.: US 6,324,450 B1
(45) Date of Patent: Nov. 27, 2001

(54) MOBILE OBJECT INFORMATION RECORDING APPARATUS

(75) Inventor: Takaaki Iwama, Tokyo (JP)

(73) Assignee: Clarion Co., Ltd, Tokyo (JP)

( * ) Notice: Subject to any disclaimer, the term of this patent is extended or adjusted under 35 U.S.C. 154(b) by 0 days.

(21) Appl. No.: 09/680,174

(22) Filed: Oct. 5, 2000

(30) Foreign Application Priority Data

Oct. 8, 1999 (JP) ................................................. 11-288172

(51) Int. Cl.[7] ............................ G08G 1/017; G06F 19/00
(52) U.S. Cl. ........................... 701/35; 340/426; 340/540; 340/326; 340/440; 369/21; 701/45; 701/19
(58) Field of Search ............................. 701/35, 301, 300; 340/436, 440, 937, 541, 539; 358/909

(56) References Cited

U.S. PATENT DOCUMENTS

| | | | |
|---|---|---|---|
| 5,581,464 | * 12/1996 | Woll et al. | 701/35 |
| 5,815,093 | * 9/1998 | Kikinis | 340/937 |
| 6,122,597 | * 9/2000 | Saneyoshi et al. | 701/301 |
| 6,163,755 | * 12/2000 | Peer et al. | 701/301 |
| 6,169,945 | * 1/2001 | Bachmaier | 701/45 |
| 6,185,490 | * 2/2001 | Ferguson | 701/35 |

* cited by examiner

*Primary Examiner*—William A. Cuchlinski, Jr.
*Assistant Examiner*—Tuan C To
(74) *Attorney, Agent, or Firm*—Price and Gess

(57) ABSTRACT

A mobile object information recording apparatus includes first and second cameras and various vehicle condition sensors for detecting mobile object information representing the status of a vehicle. An abnormal level detector detects an abnormal level of the vehicle on the basis of the acceleration detected by a 3-dimensional sensor. A data amount setting unit sets the amount of data to be stored in a file area to a value corresponding to the detected abnormal level, and memory controller stores, into the file area, mobile object information with a length of time corresponding to the determined amount of data, including periods immediately before and after the moment at which the abnormal level is detected, such as when a collision occurs, whereby the mobile object information is stored in a highly efficient fashion.

10 Claims, 4 Drawing Sheets

MOBILE OBJECT INFORMATION RECORDING APPARATUS

BACKGROUND OF THE INVENTION

1. Field of the Invention

The present invention relates to a mobile object information recording apparatus adapted to be positioned in a moving object such as a vehicle, especially such an apparatus capable of recording mobile object information such as an image around the vehicle for periods immediately at and after an occurrence of an abnormality such as an accident, crash or the like. Mobile object information detection devices installed on the vehicle, for example, a camera, an acceleration sensor and so on, can detect the information.

2. Description of the Related Art

There has been known such a mobile object information recording apparatus as a so-called drive recorder. In conventional drive recorders, mobile object information such as an image and vehicle condition data is always detected by a mobile object information detection device installed on a vehicle, and if an accident occurs with the vehicle, the mobile object information with a particular length of time including periods immediately before and after the moment at which the accident occurs is stored in a fixed file area of a memory.

Examples of the mobile object information detection device include a camera for taking an image of the inside and/or the outside of a vehicle, a microphone for collecting a braking sound or a crashing sound, a speed sensor for detecting the speed of the vehicle, an acceleration sensor for detecting the acceleration/deceleration of the vehicle, a rotational speed sensor for detecting the rotational speed of the engine, a steering angle sensor for detecting the turning angle of tires or the steering, a brake status sensor for detecting the status of the brake, a turn indicator status sensor for detecting the operation status of the turn signal, a transmission gear sensor for detecting the transmission gear position of the vehicle, and a current location sensor of a navigation system for detecting the current location or the running trajectory of the vehicle.

The memory to be disposed in such drive recorder includes both an endless storage area for temporarily storing the mobile object information continuously detected by the detection devices during movement of the object and a fixed file area for storing the mobile object information with a particular period of time around the moment at which an accident occurs.

The fixed file area has a storage capacity which allows, for example, a total of 10 files to be stored. Each file has a size large enough to record image data and vehicle condition data for a period of 45 seconds so as to respond to a somewhat larger accident. Under these circumstances, when data is stored using a so-called MPEG(Moving Pictures Experts Group) technique, the memory has to have a memory capacity as large as approximately 110MB.

In such an arranged conventional drive recorder, the mobile object information is always detected by the mobile object information detection devices, and the detected mobile object information is temporarily stored in the endless storage area. If a collision with another vehicle is detected by, for example, an acceleration sensor provided for triggering an air bag, the mobile object information with a length of time of 45 seconds including the periods immediately before and after the occurrence of the collision is read from the endless storage area and stored in the fixed file area with a length of time of 45 seconds, thereby allowing a user to understand the situation before and after the collision and thereby analyze the cause of the accident.

In the conventional drive recorder, the capacity of file area for storing the information around the accident is fixed so that each file can record mobile object information for 45 seconds to accommodate a large accident, and thus the file area has to have a huge storage capacity. In response to a somewhat smaller accident, the conventional mobile object information recording apparatus therefore still stores information for 45 seconds suitable for analyzing a large accident, and thus an unnecessarily large volume of information is stored thereinto.

An expensive flash memory has been used in the conventional apparatus, and the allowable rewriting times for the memory is apt to be very limited. If a rewriting operation is performed so many times, the flash memory has to be then replaced with a new one, and thus the whole cost of the system including such conventional apparatus has become very high. It has become necessary to provide a mobile object information recording apparatus in which a memory provided therein can be effectively used, whereby the whole cost including the apparatus can be reduced.

SUMMARY OF THE INVENTION

For this purpose, according to the present invention, there is provided a mobile object information recording apparatus comprising a detecting unit for detecting mobile object information on a status of a mobile object, a storing unit for storing the mobile object information detected by the detecting means, an abnormality level detecting unit for detecting an abnormality level on the mobile object in accordance with at least one kind of mobile object information detected by the detecting unit, a data amount setting unit for setting an amount of information to be stored in a predetermined area within the storing unit based on the abnormality level detected by the abnormality level detecting unit, and storage controlling unit for controlling the storing unit so as to store the stored mobile object information with a predetermined length of time into a predetermined area within the storing unit, the length including at least a first period immediately before the abnormality and a second period immediately after the abnormality.

DESCRIPTION OF THE ACCOMPANYING DRAWINGS

DESCRIPTION OF THE PREFERRED EMBODIMENTS

Referring to the accompanying drawings, a preferred embodiment of a mobile object information recording apparatus serving as a drive recorder according to the present invention is described below.

Figure 1:
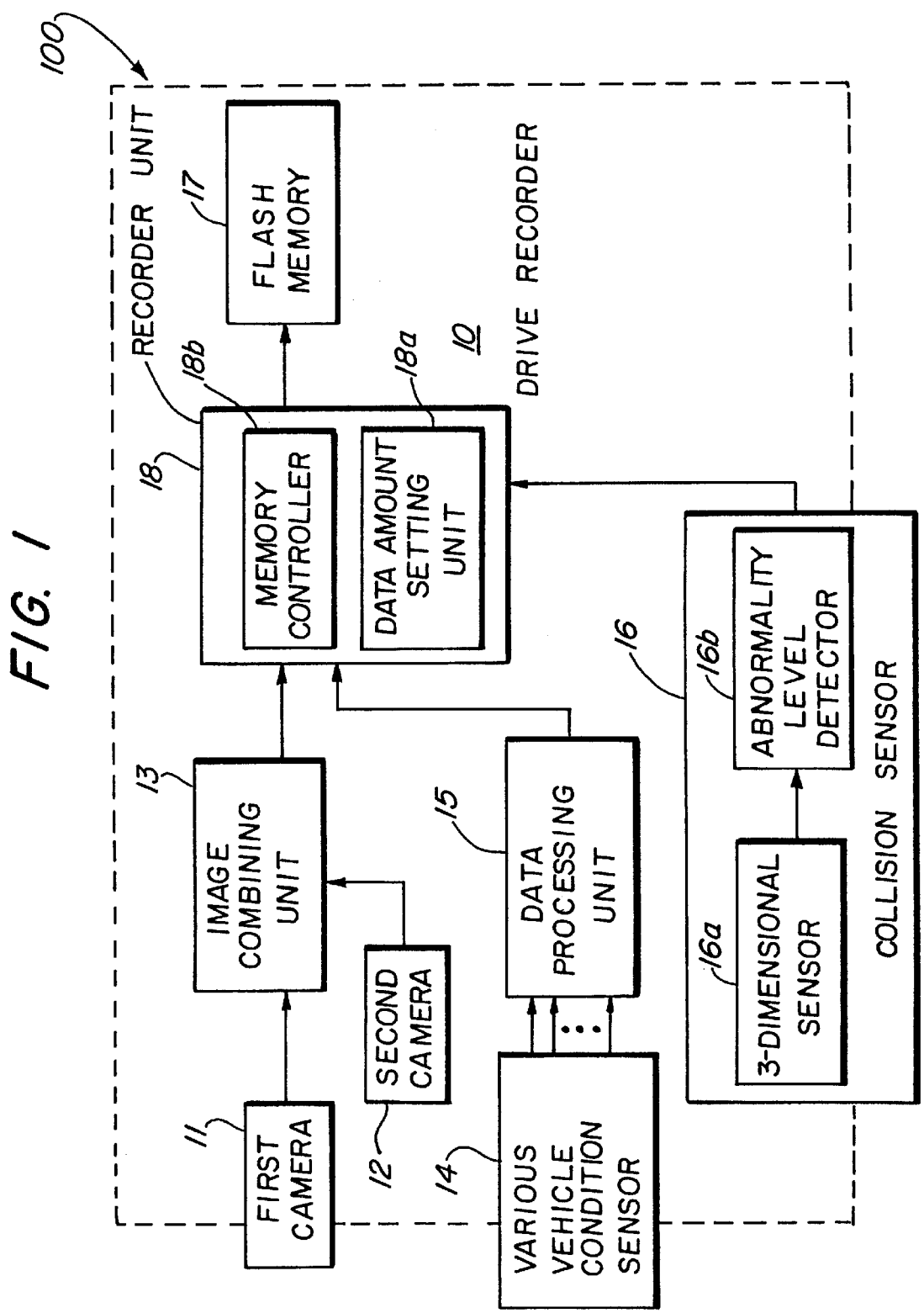
FIG. 1 is a block diagram illustrating a structure of a mobile object information recording apparatus serving as a drive recorder according to one embodiment of the present invention.

FIG. 1 shows a block diagram illustrating a structure of the drive recorder to be provided within a travelling vehicle 100 according to one embodiment of the present invention. The drive recorder 10 shown in FIG. 1 includes a first camera 11 for taking an image of the outside of a vehicle, a second camera 12 for taking an image of the inside of the vehicle, an image combining unit 13 for combining the image data taken by the first camera 11 and the image data taken by the second camera 12, various vehicle condition sensors 14 for detecting various vehicle conditions described later in detail, a data processing unit 15 for processing the data of various vehicle conditions detected by the various vehicle condition sensors 14, a collision sensor 16 for detecting a collision of the vehicle, and a recorder unit 18 which temporarily stores the various vehicle condition data processed by the data processing unit 15 and the image data combined by the image data combining unit 13 into the endless storage area 17a of a flash memory 17 as mobile object information and which reads, as will be described later, mobile object information with a particular length of time including periods immediately before and after an accident from the various vehicle data and the image data stored in the endless storage area 17a and stores it into the file area 17b of the flash memory 17.

The various vehicle condition sensors 14 may include a microphone for collecting various kind of sounds around the vehicle such as a braking sound, a collision sound or the like, a vehicle speed sensor for detecting the speed of the traveling vehicle, an acceleration/deceleration sensor for detecting the acceleration of the vehicle, a rotational speed sensor for detecting the rotational speed of the engine, a steering angle sensor for detecting the turning angle of tires or the steering, a brake status sensor for detecting the status of the brake, a turn signal status sensor for detecting the status of the turn signal, a transmission gear position sensor for detecting the transmission gear position, and a current location sensor of a navigation system for detecting the current location or the running trajectory of the vehicle.

Figure 2:
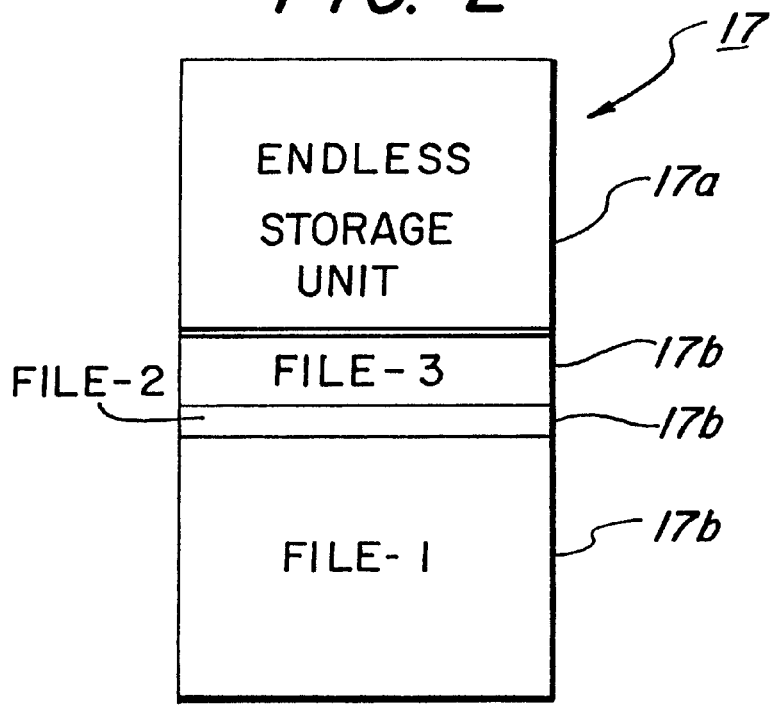
FIG. 2 is a memory map illustrating a structure of a flash memory of the drive recorder according to the embodiment of the present invention.

As shown in FIG. 2, the flash memory 17 has both an endless storage area 17a and the file area 17b. The endless storage area 17a is used to temporarily store the vehicle condition data or information detected by the various vehicle condition sensors 14 and the image data taken by the first and second cameras 11 and 12. On the other hand, the fixed file area 17b is used to store mobile object information with a particular length of time including periods immediately before and after an abnormality such as an accident or a crash which may occur. In the example shown in FIG. 2, mobile object information associated with three separate collision accidents is stored in the flash memory 17. That is, in this example, three file records respectively corresponding to the past three accidents 1 through 3 are stored in file 1 through 3 within the flash memory 17. The number of file areas 17b can be arbitrarily determined, for example, only one file area 17b may be designated.

In the endless storage area 17a of the flash memory 17, a predetermined amount of mobile object information can be continuously stored. More specifically, the endless storage area 17a has a plurality of sub storage areas, not shown, and mobile object information is written sequentially from one sub storage area to the next one. If all sub storage areas are filled with such stored information, the sub storage area storing the oldest data is overwritten with the latest data which has been read most recently.

The collision sensor 16 includes both a 3-dimensional sensor 16a and an abnormal level detector 16b. The 3-dimensional sensor 16a is for detecting the acceleration in X-Y-Z directions, and is formed of a plurality of acceleration sensors which are disposed at different locations on the vehicle to control an air bag. On the other hand, the abnormal level detector 16b is for detecting a level of the abnormality which occurs on the vehicle on the basis of the acceleration in the X-Y-Z direction detected by the 3-dimensional sensor 16a. The collision sensor 16 transmits data representing the acceleration in the X-Y-Z direction detected by the 3-dimensional sensor 16a to the data processing unit 15. The collision sensor 17 also transmits a 2-bit trigger signal, described later, corresponding to the abnormal level detected by the abnormal level detector 16b to a recorder unit 18.

The recorder unit 18 includes both a data amount setting unit 18a and a memory controller 18b. If the trigger signal is received from the collision sensor 16, the data amount setting unit 18a determines the accident level based on the received 2-bit trigger signal and sets the amount of data to be stored in the file area 17b depending upon the accident level. The memory controller 18b reads, from the endless storage area 17a, the mobile object information with a particular length of time, the amount of which is determined by the accident level. The length of data to be read includes periods immediately before and after the moment at which the trigger signal is generated, that is, at which the vehicle accident occurs. In other words, the mobile object information, the amount of which can be determined based on the accident level, is read and stored into the file area 17b.

Figures 4, 5:
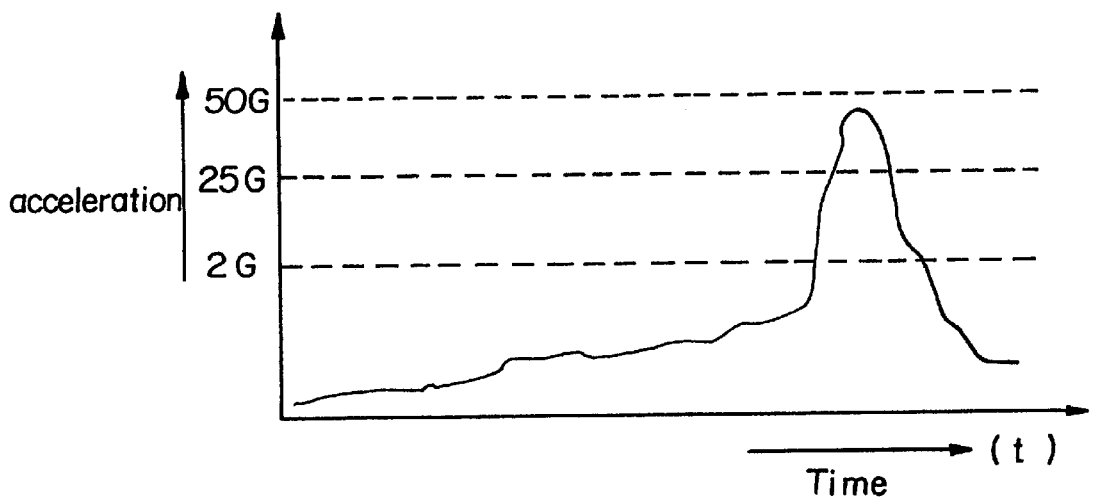
FIG. 4 is a graph illustrating an example of the X-Y-Z acceleration detected by a 3-dimensional sensor in a collision sensor of the drive recorder as a function of time t around the moment at which a collision with another vehicle occurs.
FIG. 5 is a table illustrating the relationship between a trigger signal and the amount of data determined by a data amount setting unit of the drive recorder according to the embodiment.

FIG. 4 is a graph illustrating an example of an acceleration/deceleration along one direction detected by the 3-dimensional sensor 16a in the collision sensor 16 as a function of time "t" around the moment at which a vehicle collision occurs. As shown in FIG. 4, the abnormal level detector 16b detects the abnormal level on the basis of the area of a waveform in a range along the time axis "t" in which the acceleration detected by the 3-dimensional sensor 16a has values greater than 25 G.

Figure 3:
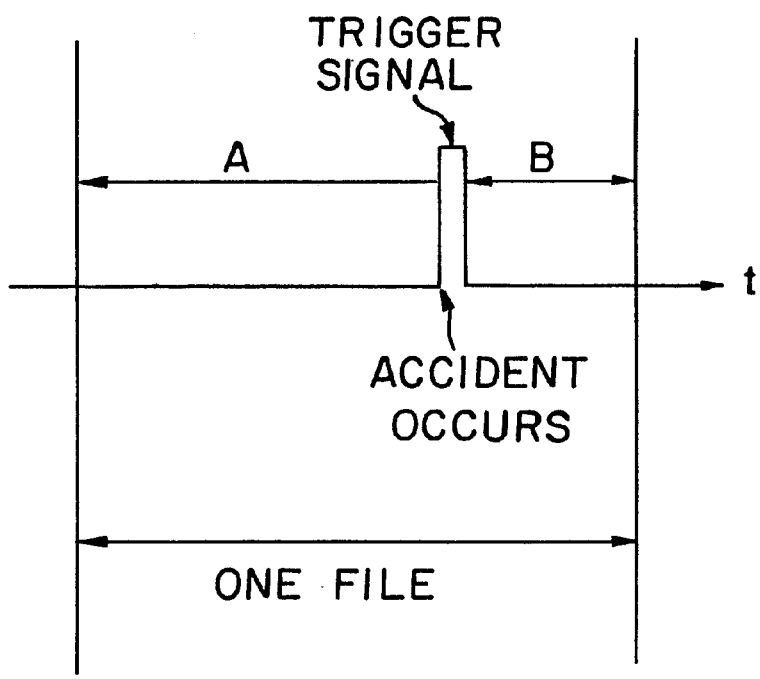
FIG. 3 is a schematic diagram illustrating an operation of generating mobile object information to be stored in a file area of the memory.

An operation of the flash memory 17 and the recorder unit 18 provided within the drive recorder according to the present invention will be further described with reference to FIGS. 3 through 5. When the maximum acceleration detected by the 3-dimensional sensor 16a is greater than 50 G, the abnormal level detector 16b determines that the accident level is "large" and generates a trigger signal. The signal has a bit value "11" as shown in FIG. 5, thereby causing the data amount setting unit 18a to set the amount of data to be stored in the file area 17b to a value corresponding to a total length of time of 45 seconds. The length 45 seconds includes a period of 30 seconds, i.e., period A shown in FIG. 3, before the accident and a period of 15 seconds, i.e., period B shown in FIG. 3, after the accident. When the acceleration detected by the 3-dimensional sensor 16a is in the range from 25 G to 50 G, the abnormal level detector 16b determines that the accident level is "intermediate" and generates a trigger signal. The signal has a bit value "10" as shown in FIG. 5, thereby causing the data amount setting unit 18a to set the amount of data to be stored in the file area 17b to a value corresponding to a total length of time of 25 seconds. The length includes a period of 15 seconds, i.e., period A, before the accident and a period of 10 seconds, i.e., period B, after the accident. When the acceleration detected by the 3-dimensional sensor 16a is in a range from 2 G to 25 G, the abnormal level detector 16b determines that the accident level is "small" and generates a trigger signal. It has a bit value "01" as shown in FIG. 5, thereby causing the data amount setting unit 18a to set the amount of data to be stored in the file area 17b to a value corresponding to a total length of time of 10 seconds. The length includes a period of 5 seconds, i.e., period A, before the accident and a period of 5 seconds, i.e., period B, after the accident. When the acceleration detected by the 3-dimensional sensor 16a is lower than 2 G, the abnormal level detector 16b generates a trigger signal having a bit value "00" as shown in FIG. 5. The signal thereby notifies the recorder unit 18 that data should not be stored in the file area 17b. A data table as shown in FIG. 5 can be stored in advance at any desired area in the flash memory 17.

The whole operation of the drive recorder 10 according to the present invention will be described below.

The image combining unit 13 of the drive recorder 10 combines the image data taken by the first camera 11 and the image data taken by the second camera 12 so as to obtain image data representing the status of the inside and outside of the vehicle. The resultant image data is supplied to the recorder unit 18.

The data processing unit 15 processes vehicle condition data representing the various vehicle conditions detected by the various vehicle condition detectors 14, such as the acceleration of the vehicle, the steering angle, the vehicle location, and so on. The resultant vehicle condition data is supplied to the recorder unit 18.

The memory controller 18b of the recorder unit 18 supplies the image data and the vehicle condition data at the same time to the flash memory 17 so as to sequentially store them in the endless area 17a in the flash memory 17.

When the vehicle on which the drive recorder 10 is installed encounters an accident, the drive recorder 10 operates as follows.

The collision sensor 16 detects the X-Y-Z acceleration through the 3-dimensional sensor 16a provided for controlling the air bag and transmits the detected acceleration to the abnormal level detector 16b. The abnormal level detector 16b detects the abnormal level on the basis of the X-Y-Z acceleration as a function of time "t" as shown in FIG. 4 and supplies a trigger signal shown in FIG. 5 corresponding to the abnormal level to the recorder unit 18.

The data amount setting unit 18a of the recorder unit 18 determines the accident level from the trigger signal corresponding to the detected abnormal level and sets the amount of data depending upon the accident level.

The memory controller 18b allocates a memory space to the file area 17b in the flash memory 17 in accordance with the amount of data set by the data amount setting unit 18a.

For example, if the data amount setting unit 18a receives an output trigger signal having a value "11", it sets the amount of data to a value for 45 seconds in total corresponding to the trigger signal as shown in FIG. 5. The memory controller 18b allocates a memory space corresponding to the determined amount of data for 45 seconds in total in the file area 17b.

The memory controller 18b reads, from the endless area 17a of the flash memory, the vehicle condition data and the image data with a length of time of 45 seconds. It includes a period of 30 seconds, period A, before the accident plus a period of 15 seconds, period B, after the accident in the case of a high-level accident. The vehicle condition data such as the image data during these periods are stored into the allocated file area 17b. It should be noted that the number or level of abnormality can be arbitrarily determined. In the embodiment, three (3) levels are determined.

Figure 6:
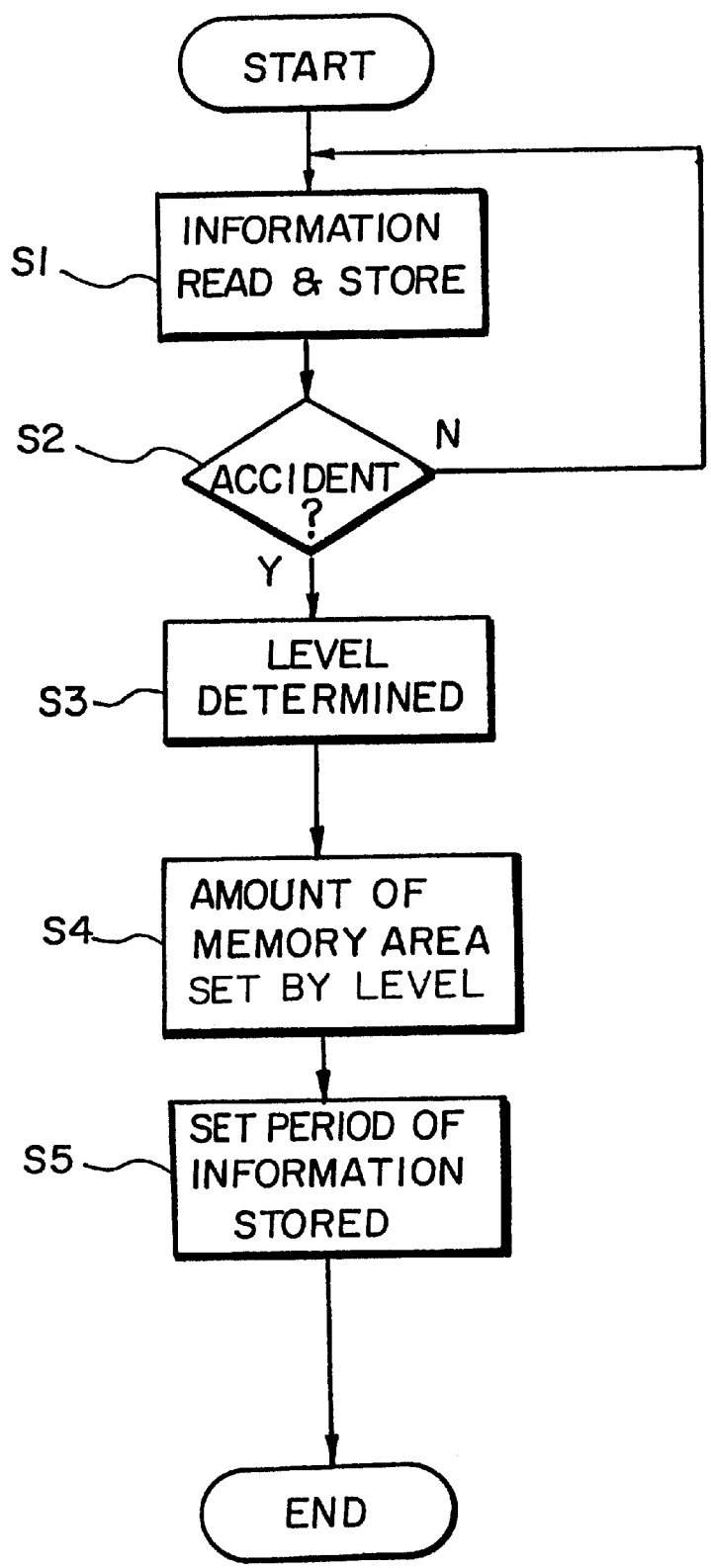
FIG. 6 is a flowchart illustrating an operation of the drive recorder according to the embodiment.

FIG. 6 shows a flowchart briefly illustrating an operation of the drive recorder according to the invention.

At step S1, information on a travelling vehicle is continuously detected by first and second cameras 11 and 12. At step S2, it has been sought whether or not an accident such as a crash occurs. In this embodiment, an occurrence of an accident is determined by an acceleration value detected by the acceleration sensor 16. S3 determines the level of accident by the abnormality level detector 16b, and at step S4, an amount of information to be separately stored is determined. In this embodiment, three(3) kinds of information amounts are determined, i.e., for 45 seconds of periods, 25 seconds and 10 seconds. At step S5, information around the accident is stored in file area 17b in accordance with the amount set at step S4.

In the present embodiment, as described above, the accident level is determined on the basis of the X-Y-Z acceleration detected by the collision sensor 16. The amount of data to be stored in the file area 17b of the flash memory 17 is variably determined depending upon the accident level, thereby allowing the flash memory 17 to be used in a highly efficient fashion.

Although the flash memory 17 is generally expensive and the maximum allowable number of times of rewriting operations is limited, the efficient use of the flash memory 17 achieved by the present invention allows a reduction in the number of times of rewriting operations and thus a reduction in the total system cost.

Although in the embodiment described above, the accident level is determined on the basis of the X-Y-Z acceleration detected by the collision sensor 16, the accident level may also be determined on the basis of the mobile object information detected by the various vehicle condition sensors 14, such as the level of the collision sound detected by the microphone, the braking condition, the speed of the vehicle, the image recognition, the vehicle-to-vehicle distance, etc.

In the mobile object information recording apparatus according to the present invention, if an abnormal level of the mobile object is detected by the abnormal level detection devices, the amount of data to be stored in the file area of the storage device is determined according to the detected level. The mobile object information with a length of time corresponding to the determined amount of data, including periods immediately before and after the moment at which the abnormal level is detected, is stored in the file area. It then becomes possible for the mobile object information to be stored in the memory in a highly efficient fashion and thus allowing a reduction in the total system cost.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A mobile object information recording apparatus comprising:

detecting means for detecting mobile object information on a status of a mobile object;

storing means for storing the mobile object information detected by the detecting means;

abnormality level detecting means for detecting an abnormality level of the mobile object in accordance with at least one kind of mobile object information detected by the detecting means;

data amount setting means for setting an amount of information to be stored in a predetermined area within the storing means based on the abnormality level detected by the abnormality level detecting means; and storage controlling means for controlling the storing means so as to store mobile object information of a predetermined length of time into a predetermined area within the storing means, the length including at least a first period immediately before the abnormality.

2. The mobile object information recording apparatus according to claim 1, wherein;

the mobile object comprises a travelling vehicle;

the detecting means comprises at least one camera for taking an image around the vehicle; and the abnormality level detecting means comprises an acceleration sensor detecting as an abnormality a particular acceleration of the vehicle.

3. The mobile object information recording apparatus according to claim 1, wherein the storing means which includes a flash memory comprises both a first storage area for continuously storing the mobile object information in a predetermined amount during movement of the mobile object and a second storage area for storing the information in the amount set by the data amount setting means.

4. The mobile object information recording apparatus according to claim 3, wherein the second storage area includes a plurality of areas each of which stores the information corresponding to respective abnormalities.

5. The mobile object information recording apparatus according to claim 1, wherein the level detected by the abnormality level detecting means is classified into a plurality of level states in accordance with a value of the level, and the amount to be stored is determined in accordance with the states.

6. The mobile object information recording apparatus according to claim 5, wherein a relationship between the level values and state are stored with a table-form in the storing means.

7. A mobile object information recording method including the steps of:

continuously detecting and storing mobile object information on a status of a mobile object;

detecting an abnormality level of the mobile object in accordance with at least one kind of detected mobile object information;

setting an amount of data regarding the stored information to be separately stored form the information having been stored based on the detected abnormality level; and storing the information in the set amount around the occurrence of the abnormality, the information to be stored including at least information on a status of the mobile object immediately before the detected abnormality.

8. An information recording system for a vehicle comprising:

a detector unit for detecting a plurality of information representative of the status and surrounding scene of a vehicle;

a storing unit for continuously storing the detected information;

an abnormality level detecting unit for detecting the occurrence of an abnormality characteristic of an accident from at least one of the plurality of information and providing an output signal representative of the level of detection;

data amount setting unit for setting an amount of detected information to be permanently stored in a predetermined area of the storing unit based on the output signal of the abnormality level detecting unit; and a storage controlling unit for controlling the storing unit to store a predetermined amount of information into the predetermined area including information representative of a first period of time immediately before the detected abnormality.

9. The information recording system of claim 8, wherein the detector unit includes a first camera and an acceleration sensor.

10. The information recording system of claim 9, wherein the detector includes a second camera for recording exterior scenes relative to the vehicle, while the first camera records internal scenes relative to the vehicle.

* * * * *